US007881646B2

(12) United States Patent
Nakamura et al.

(10) Patent No.: US 7,881,646 B2
(45) Date of Patent: Feb. 1, 2011

(54) DEVELOPING ROLLER AND MANUFACTURING METHOD THEREOF, PROCESS CARTRIDGE AND ELECTROPHOTOGRAPHIC IMAGE FORMING APPARATUS

(75) Inventors: Minoru Nakamura, Mishima (JP); Kazuaki Nagaoka, Susono (JP); Yoshiyuki Takayama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/719,419

(22) Filed: Mar. 8, 2010

(65) Prior Publication Data

US 2010/0158564 A1 Jun. 24, 2010

Related U.S. Application Data

(63) Continuation of application No. PCT/JP2009/068862, filed on Oct. 28, 2009.

(30) Foreign Application Priority Data

Nov. 18, 2008 (JP) ............................ 2008-294293

(51) Int. Cl.

*G03G 15/08* (2006.01)
*A01B 29/00* (2006.01)
*B05C 11/00* (2006.01)
*F16C 13/00* (2006.01)

(52) U.S. Cl. ...................... 399/279; 399/265; 399/286; 492/28; 492/48; 492/53; 492/56

(58) Field of Classification Search ................. 399/265, 399/279, 286; 492/28, 48, 53, 56
See application file for complete search history.

(56) References Cited

U.S. PATENT DOCUMENTS

| | | | | |
|---|---|---|---|---|
| 5,790,926 | A * | 8/1998 | Mizoe et al. | 399/174 |
| 5,867,755 | A | 2/1999 | Sato | |
| 6,390,961 | B1 * | 5/2002 | Nakada et al. | 492/56 |
| 6,703,094 | B2 * | 3/2004 | Kakii et al. | 428/36.91 |
| 6,945,921 | B2 * | 9/2005 | Sirejacob | 492/56 |
| 7,505,720 | B2 * | 3/2009 | Sugama et al. | 399/286 |
| 7,570,905 | B2 | 8/2009 | Kusaba et al. | |
| 2003/0219589 | A1 * | 11/2003 | Taniguchi et al. | 428/323 |

(Continued)

FOREIGN PATENT DOCUMENTS

JP 08-185042 7/1996

(Continued)

*Primary Examiner*—David P Porta
*Assistant Examiner*—Mindy Vu
(74) *Attorney, Agent, or Firm*—Fitzpatrick, Cella, Harper & Scinto

(57) ABSTRACT

A developing roller suppresses scattering of toner during a developing process and provides a further higher-quality electrophotographic image. The developing roller has a mandrel, an elastic layer provided on the circumference of the mandrel, and a surface layer provided on the circumference of the elastic layer. The surface layer contains a urethane resin serving as a binder and urethane resin particles dispersed in the binder, for forming convex portions on the surface of the surface layer. The surface of the urethane resin particles is partly covered with fine inorganic particles containing at least one element selected from silicon, titanium and aluminum and the urethane resin particles are in direct contact with the binder at the surface onto which the fine inorganic particles are not attached.

6 Claims, 3 Drawing Sheets

U.S. PATENT DOCUMENTS

| | | | | |
|---|---|---|---|---|
| 2004/0205967 | A1 * | 10/2004 | Barnes et al. | 29/895.32 |
| 2005/0049127 | A1 * | 3/2005 | Nagata | 492/30 |
| 2008/0193172 | A1 | 8/2008 | Kusaba et al. | |

FOREIGN PATENT DOCUMENTS

| | | |
|---|---|---|
| JP | 09-160372 | 6/1997 |
| JP | 09-185246 | 7/1997 |
| JP | 10-90996 | 4/1998 |
| JP | 3087994 | 9/2000 |
| JP | 2005-258201 | 9/2005 |
| JP | 2005-283912 | 10/2005 |
| JP | 3832057 | 10/2006 |
| JP | 2008-112150 | 5/2008 |

* cited by examiner

DEVELOPING ROLLER AND MANUFACTURING METHOD THEREOF, PROCESS CARTRIDGE AND ELECTROPHOTOGRAPHIC IMAGE FORMING APPARATUS

CROSS-REFERENCE TO RELATED APPLICATIONS

This application is a continuation of International Application No. PCT/JP2009/068862, filed Oct. 28, 2009, which claims the benefit of Japanese Patent Application No. 2008-294293, filed Nov. 18, 2008.

BACKGROUND OF THE INVENTION

1. Field of the invention

The present invention relates to a developing roller and a process cartridge for use in an electrophotographic image forming apparatus, and an electrophotographic image forming apparatus.

2. Description of the Related Art

In Japanese Patent Application Laid-Open No. 2008-112150 (U.S. Pat. Publication No. 2008/0193172), a developing roller is described having a surface layer, which is formed around a mandrel and contains a urethane resin and urethane resin particles, and having a convex portion derived from the urethane resin particles on the surface.

Recently, a demand for forming a high quality electrophotographic image has further increased. Under the circumstance, a matter of concern is how faithfully an electrostatic latent image formed on an electrophotographic photosensitive member is developed. The present inventors have repeatedly conducted studies on a contact development apparatus using a developing roller described in Japanese Patent Application Laid-Open No. 2008-112150 (U.S. Pat. Publication. No. 2008/0193172). As a result, they found that toner is slightly scattered in a developing process of an electrostatic latent image formed on an electrophotographic photosensitive member. They recognized that such scattering of toner should be overcome in order to further improve the quality of an electrophotographic image.

SUMMARY OF THE INVENTION

The invention is directed to provide a developing roller capable of suppressing scattering of toner in a developing process and further improving the quality of an electrophotographic image to be provided.

Furthermore, the present invention is directed to provide an electrophotographic image forming apparatus capable of providing a high quality electrophotographic image and a process cartridge to be used in the apparatus.

According to one aspect of the present invention, there is provided a developing roller comprising a mandrel, an elastic layer formed on the circumference of the mandrel and a surface layer formed on the circumference of the elastic layer, wherein the surface layer contains a urethane resin serving as a binder and urethane resin particles dispersed in the binder, for forming convex portions on the surface of the surface layer, the surface of the urethane resin particle is partly covered with fine inorganic particles containing at least one element selected from silicon, titanium and aluminum, and the urethane resin particle is in direct contact with the binder at the surface onto which the fine inorganic particles are not attached.

According to another aspect of the present invention, there is provided a process cartridge comprising the above-mentioned developing roller and an electrophotographic photosensitive member and being detachably attached to a main body of an electrophotographic image forming apparatus. According to further aspect of the present invention, there is provided an electrophotographic image forming apparatus comprising an electrophotographic photosensitive member and a developing roller arranged in contact with the electrophotographic photosensitive member, wherein the developing roller is the above-mentioned developing roller.

According to the present invention, it is possible to effectively suppress slight scattering of toner in the proximity of a nip at which an electrophotographic photosensitive member is in contact with a developing roller, in a developing step. As a result, the image quality of an electrophotographic image can be further improved.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have conducted the following studies in order to specify a cause of scattering of toner, which sometimes occurs when the developing roller described in Japanese Patent Application Laid-Open No. 2008-112150 (U.S. Pat. Publication. No. 2008/0193172) is used in contact development. To describe more specifically, a developing roller was manufactured which a surface layer containing urethane resin particles and a urethane resin serving as a binder and having the urethane resin particle dispersed therein, and having a convex portion derived from the urethane resin particles on the surface. Then, the state of the surface of the developing roller at a nip portion between the developing roller and the photosensitive member was observed. As a result, the following facts i) to iii) were found.

i) In the nip formed between the developing roller in contact with the photosensitive member, a convex portion on the surface of the developing roller is deformed by friction with the photosensitive member.

ii) The convex portion deformed returns to an original shape immediately after it passes the nip.

iii) Subsequently, toner remaining on the surface is scattered when the deformed shape returns to the original shape and attaches to the surface of the electrophotographic photosensitive member on which an electrostatic latent image has not yet been formed.

Figure 6A:
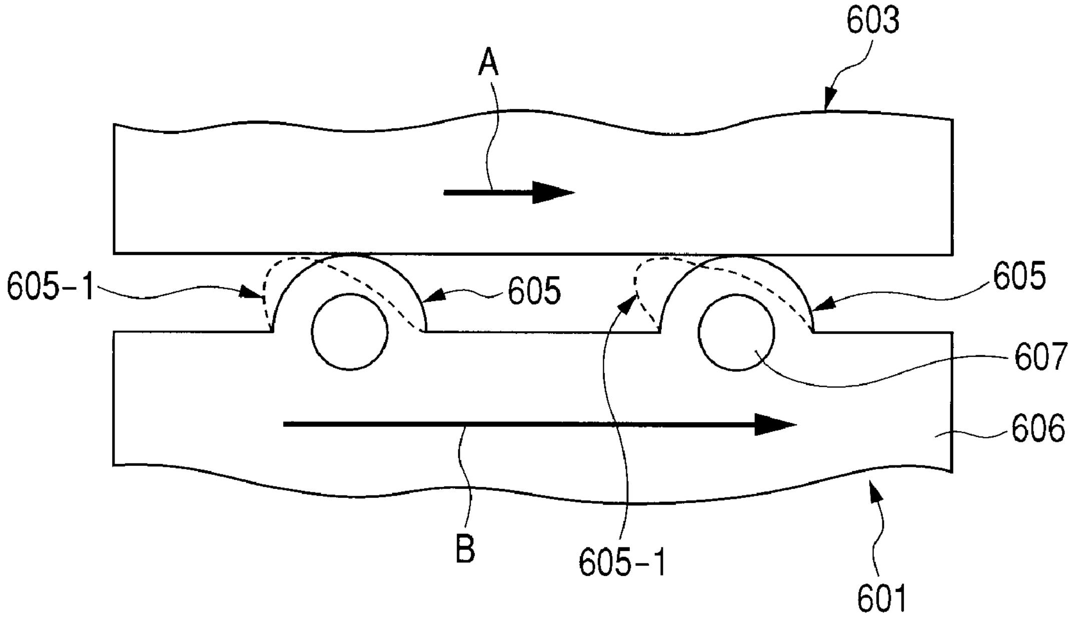
FIG. 6A is an illustration for describing the principal of the present invention.
Figure 6B:
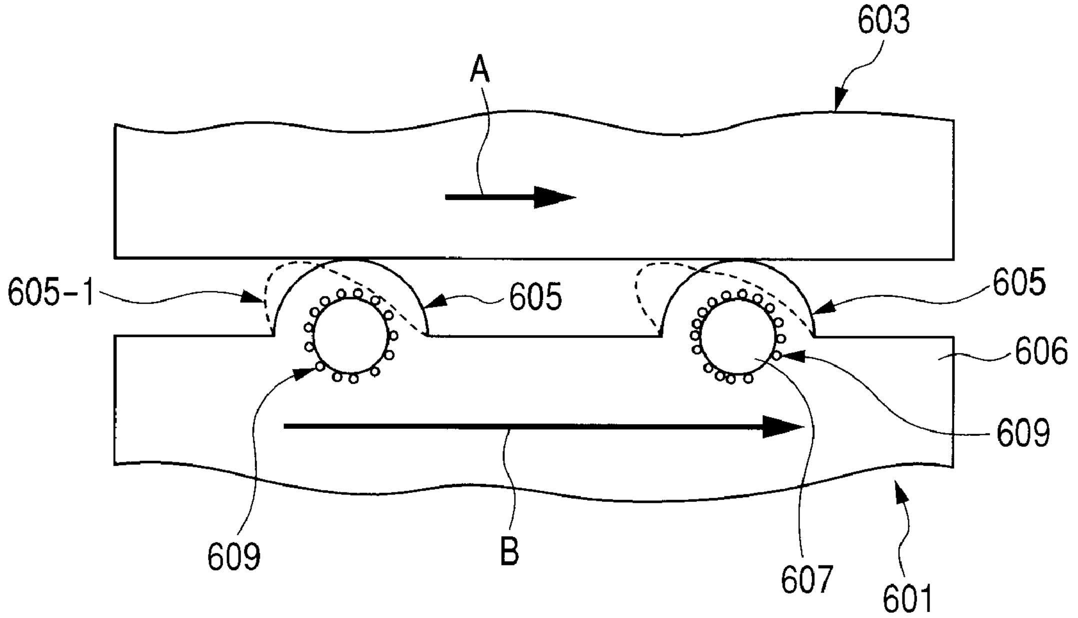
FIG. 6B is an illustration for describing the principal of the present invention.

More specifically, in the electrophotographic image forming apparatus, a charging roller is generally smaller in diameter than an electrophotographic photosensitive member and rotated at a higher speed than the electrophotographic photosensitive member. Therefore, as is schematically illustrated in FIG. 6 A, in the nip between a charging roller 601 and an electrophotographic photosensitive member 603, the circumferential speeds significantly differ as shown by arrows A and B. Since the circumferential speeds significantly differ, a convex portion 605 on the surface of the charging roller deforms backwards in a rotation direction of the charging roller, as shown by a dotted line (605-1). At this time, since a urethane resin 606 serving as a binder strongly adheres to a urethane resin particle 607 by a chemical bond, a restorative force to an original shape of the convex portion strongly works. Consequently, returning the shape of the convex portion to the original shape rapidly occurs immediately after passing through the nip. Toner is scattered by the momentum at this time. Then, the present inventors manufactured a developing roller, in which fine inorganic particles 609 are attached properly onto the surface of a urethane resin particle 607 for forming a convex portion, as is schematically illustrated in FIG. 6B. When such a developing roller was used in contact development, scattering of toner was significantly reduced in the nip with a photosensitive member although the convex portion of the developing roller surface deformed. This is because the urethane resin particle 607 is in direct contact with the urethane resin 606 serving as a binder at a portion onto which the fine inorganic particles 609 are not attached, and chemically bound just at the portion. For the reason, the force for returning the deformed convex portion 605-1 to an original shape is relatively reduced. As a result, scattering of toner is conceivably suppressed.

On the other hand, when the amount of fine inorganic particles to be attached (cover) to a urethane resin particle is increased and the urethane resin particle is sufficiently covered with the inorganic particles, the urethane resin of the surface layer comes not to be in contact with the urethane resin particle at any portion. In this case, since the fine inorganic particles interpose between the urethane resin and the urethane resin particle, they cannot chemically bind to each other and no adhesion occurs. In such a case, the urethane resin particle sometimes falls off from the surface layer during long operational use. If so, the transfer amount of toner on the developing roller varies from that of the beginning and sometimes transport property of toner becomes unstable.

The present invention was made based on the above new findings by the present inventors. To describe more specifically, a developing roller according to the present invention has a mandrel, an elastic layer formed on the circumference of the mandrel and a surface layer formed on the circumference of the elastic layer. The surface layer contains a urethane resin serving as a binder and urethane resin particles dispersed in the binder, for forming convex portions of the surface of the surface layer. The urethane resin particle is partly covered with fine inorganic particles containing at least one element selected from silicon, titanium and aluminum. By this constitution, the urethane resin particle is in direct contact with the binder at a surface portion onto which the fine inorganic particles are not attached. A developing roller according to the present invention is formed by providing an elastic layer and a surface layer on the circumference of the mandrel.

Figure 1:
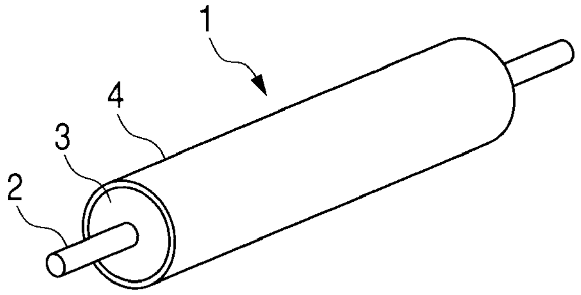
FIG. 1 is a conceptual view illustrating a developing roller of the present invention.
Figure 2:
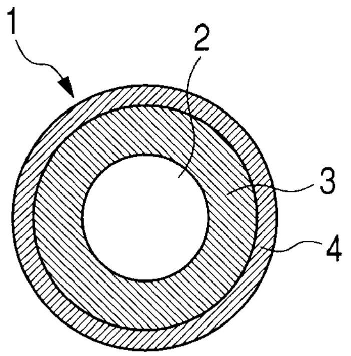
FIG. 2 is a conceptual view illustrating a section of a developing roller of the present invention.

FIG. 1 and FIG. 2 are a schematic perspective view of a developing roller according to the present invention and a schematic sectional view of the developing roller when the developing roller is cut in the perpendicular direction to a rotation shaft. As illustrated in FIG. 1 and FIG. 2, a developing roller 1 is formed of a cylindrical (solid) or cylindrical (hollow) conductive mandrel 2, an elastic layer 3 formed on the circumference surface of the mandrel and a surface layer 4 formed on the circumference surface of the elastic layer.

Furthermore, the surface layer 4, as illustrated in FIG. 6B, contains the urethane resin 606 serving as a binder and the urethane resin particles 607 dispersed in the binder, for forming convex portions on the surface of the surface layer. The surface of the urethane resin particle 607 is partly covered with the fine inorganic particles 609 containing at least one element selected from silicon, titanium and aluminum. By this constitution, the urethane resin particle is in direct contact with the binder at the surface onto which the fine inorganic particles are not attached. This is important. The present invention will be further specifically described below.

<Conductive Mandrel 2>

The conductive mandrel 2 serves as an electrode and a support member of the developing roller 1. Examples of the material of the conductive mandrel include a metal or alloy such as aluminum, a copper alloy and stainless steel; iron plated with chromium and nickel, etc.; and a synthetic resin having conductivity. The outer diameter of the mandrel generally falls within the range of 4 to 10 mm.

<Elastic Layer 3>

As the resin base of the elastic layer 3, the following materials can be specifically mentioned: polyurethane, natural rubber, butyl rubber, nitrile rubber, isoprene rubber, butadiene rubber, silicone rubber, styrene-butadiene rubber, ethylene-propylene rubber, ethylene-propylene-diene rubber, chloroprene rubber and acrylic rubber. These can be used alone or in combination of two or more types. Of them, silicone rubber is preferred since it has not only an appropriate elasticity but also a low permanent compression set. Examples of the silicone rubber include polydimethyl siloxane, polymethyl trifluoropropyl siloxane, polymethylvinyl siloxane, polyphenylvinyl siloxane and copolymers of these polysiloxanes. These can be used alone or in combination with two or more types, if necessary.

As a conductive material to impart conductivity to the elastic layer 3, either an electronic conductive material or an ionic conductive material may be used. Examples of the electronic conductive material include a conductive carbon black such as acetylene black, a metal such as copper, silver and germanium and oxides of these. Examples of the ionic conductive material include sodium perchlorate, lithium perchlorate, calcium perchlorate, lithium chloride, modified aliphatic dimethylammonium ethosulfate, and stearylammonium acetate. These may be used alone or in combination with two or more types.

Figure 3:
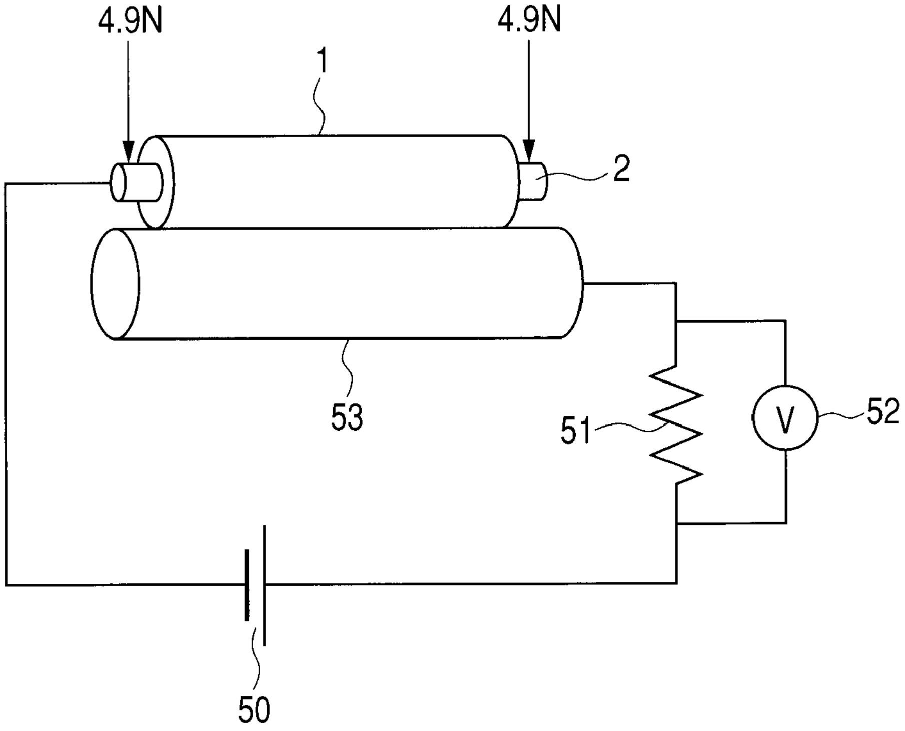
FIG. 3 is an illustration for describing how to measure the electric resistivity of a developing roller.

Such a conductive material is used in an amount necessary for the elastic layer 3 to have a desired volume resistivity. A conductive material can be used, for example, within the range of 0.5 to 50 parts by mass relative to 100 parts by mass of the resin base, and more preferably, within the range of 1 to 30 parts by mass. Furthermore, the electric resistance of the elastic layer 3 is $1\times10^{3}\Omega$ or more and $1\times10^{13}\Omega$ or less, and more preferably, $1\times10^{4}\Omega$ or more and $1\times10^{12}\Omega$ or less. The electric resistance was measured by use of an electric resistance measuring instrument illustrated in FIG. 3. Upon each of the two ends of the conductive mandrel 2 of the developing roller 1, a weight of 4.9 N was loaded. The developing roller 1 was pressed against a metal drum 53 of 30 mm in diameter. While rotating the roller at a rotation number of 1 rps, a direct voltage of 50 V was applied from a power source 50. The voltage applied to a resistor 51 (10 kΩ) and indicated in a voltmeter 52 were read for 30 seconds. An arithmetic average value thereof was calculated to obtain a value of current flowing through the measuring circuit. Next, based on the current value thus obtained, the electric resistance value of the developing roller 1 was obtained according to the Ohm's law.

Furthermore, the Asker-C hardness of the elastic layer 3 is preferably 25° to 70°, and particularly preferably 30° to 60°. If the hardness falls within this range, the width of the contact nip with a photosensitive member can be stably maintained. Measurement of the Asker-C hardness can be performed according to the rubber material hardness measuring method, more specifically, using a test piece separately prepared according to the Basic Standard Asker-C type SRIS (the Society of Rubber Industrial Standard in Japan) 0101, by means of an Asker rubber hardness meter (manufactured by IPROS Corporation).

As a method for manufacturing the elastic layer 3, the following methods are mentioned. The elastic layer is manufactured on the circumference of the conductive mandrel 2 on which an adhesive agent, etc., has been appropriately applied. There is another method for manufacturing the elastic layer 3, in which a composition for forming the elastic layer 3 is injected into the cavity of a mold, in which the conductive mandrel 2 has been placed, and reacted/hardened or solidified with the application of heat and an activation energy ray, etc., to integrate it with the conductive mandrel 2.

As still another method, a slab or block is previously prepared by use of a composition for forming the elastic layer 3. The slab or block is cut and processed to obtain a tube having a predetermined shape and size. To the tube, the conductive mandrel 2 was placed with application of pressure. In this manner, the elastic layer 3 is formed on the conductive mandrel 2.

<Surface Layer 4>

The surface layer 4 contains a urethane resin serving as a binder and urethane resin particles dispersed in the binder, for forming convex portions on the surface of the surface layer. The surface of the urethane resin particle is partly covered with fine inorganic particles containing at least one element selected from silicon, titanium and aluminum. By this constitution, the urethane resin particle is in direct contact with the binder at a surface portion onto which the fine inorganic particles are not attached.

The surface layer 4 can be formed by previously covering urethane resin particles with fine inorganic particles by externally adding them, dispersing the urethane resin particles in a urethane resin material of the surface layer 4, and hardening a coating film of a coating material for the surface layer 4. Note that if fine inorganic particles are directly contained in the urethane resin of the surface layer 4, the surface of fine inorganic particles is completely covered with the urethane resin. In this state, even if urethane resin particles not covered with fine inorganic particles are dispersed therein, the entire surface of the urethane resin particles chemically binds to the urethane resin. Therefore, the developing roller of the present invention cannot be obtained.

The raw material for a urethane resin serving as a binder is constituted of a polyol and an isocyanate, if necessary, a chain extender. Examples of the polyol constituting the raw material for a urethane resin include polyether polyol, polyester polyol, polycarbonate polyol, polyolefin polyol, acrylic polyol and mixtures of these. Examples of the isocyanate constituting the raw material for a urethane resin include: tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), cyclohexane diisocyanate, polymeric diphenylmethane diisocyanate and mixtures of these. Examples of the chain extender constituting the raw material for a urethane resin include ethylene glycol, a bifunctional low molecular-weight diol such as 1,4-butanediol and 3-methylpentanediol; a trifunctional low molecular-weight triol such as trimethylol propane and mixtures of these.

The surface of the urethane resin particles, which are dispersed in the surface layer 4, for forming convex portions on the surface of the developing roller, is partly covered with fine inorganic particles containing at least one element selected from silicon, titanium and aluminum.

The urethane resin constituting the urethane resin particle is not particularly limited as long as it can adhere to the urethane resin of the surface layer 4. For example, polyether urethane, polyester urethane, polycarbonate urethane and acrylic urethane and the like are mentioned. In the present invention, a urethane resin particle formed of a single material may be used alone. Alternatively, a urethane resin particle formed of two or more materials may be used in combination. The average particle size of the urethane resin particle preferably falls within the range of 2 μm to 30 μm. In particular, to form a convex portion of the surface layer 4, thereby providing stable toner transport property, an average particle size within the range of 5 μm to 18 μm is more preferable. The average particle size of these particles is defined as follows. The surface layer 4 of the developing roller 1 is cut by a razor blade perpendicular to the conductive mandrel 2. Then, 1000 particles are arbitrarily selected from a plurality of cut surfaces and the diameters of the particles are measured by an optical microscope. An arithmetic average value thereof is defined as the average particle size of these particles. Furthermore, when the shape of the particles is not spherical and the diameter of the particles cannot be specified in a single way, the longest diameter and the shortest diameter are separately measured and an arithmetic average value of them is defined as the average particle size of the particles.

According to the studies made by the present inventors, when the surface layer 4 contains a urethane resin particle having a particle size of 10 μm or more and 30 μm or less and having fine inorganic particles attached thereto, it was found that slight scattering of toner and toner transport property are easily obtained particularly in balance. The reason therefor is considered as follows: The urethane resin particles have more or less a particle size distribution varying depending upon the manufacturing method. In the particle size distribution, particles having a relatively larger particle size (10 μm or more and 30 μm or less) have an excellent toner transport property. Also, particles having a relatively larger particle size frequently come to be in direct contact with an electrophotographic photosensitive member. For this reason, when conventional urethane resin particles having no fine inorganic particles attached thereto are used, scattering of toner is likely to occur more significantly. In contrast, when particles having a particle size of 10 μm or more and 30 μm or less are at least present in the surface layer 4 according to the constitution of the present invention, slight scattering of toner is prevented at the portion; at the same time, a stable transport property of toner can be ensured. The particles sizes of individual particles of surface layer 4 are measured by the same method as above.

Next, the material for fine inorganic particles covering a urethane resin particle is not particularly limited as long as the material contains at least one element selected from silicon, titanium and aluminum. The typical examples include silica, titanium oxide, aluminum oxide and hydrotalcite, etc. To these fine inorganic particles, if necessary, a surface treatment such as a hydrophobic treatment and a hydrophilic treatment may be applied. Particularly, silica can be suitably used since a surface treatment can be easily applied and the affinity for a urethane resin particle can be easily controlled. These fine inorganic particles may be used alone or in combination of a plurality of types to cover a urethane resin particle. The average primary particles size of the fine inorganic particles is preferably 5 nm or more and 200 nm or less since satisfactory coverage of a urethane resin particle can be made. Furthermore, since coating can be effectively performed by a small addition amount, the average primary particles size is more preferably 5 nm or more and 50 nm or less.

The aforementioned urethane resin particle can be obtained by a known suspension polymerization method and an emulsion polymerization method. A requisite amount of fine inorganic particles is externally added to the urethane resin particle thus obtained to obtain the urethane resin particle to be used in the present invention. External addition can be performed by a mixing method using a conventional mixing apparatus, for example, a double cone mixer, a V-shape mixer, a drum-shape mixer, a super mixer, Henschel mixer and Nauta mixer, etc. Furthermore, fine inorganic particles can be also added in the middle of a synthesis process.

In order to further enhance the effect of suppressing scattering of toner exerted by the present invention, the coverage of urethane resin particle with fine inorganic particles in the surface layer 4 is preferably 30% or more and 80% or less, and particularly preferably 40% or more and 75% or less. The coverage of a urethane resin particle with fine inorganic particles can be controlled by controlling an amount ratio of urethane resin particle to the fine inorganic particles externally added and by controlling the time and the speed for stirring the mixture after the fine inorganic particles are added to the urethane resin particle. The coverage can be enhanced by increasing the external addition amount of fine inorganic particles relative to the urethane resin particle. Furthermore, the coverage can be also enhanced by increasing stirring speed and time of the mixture after external addition. The coverage of a urethane resin particle with fine inorganic particles in the surface layer 4 herein is measured as follows.

(Preparation of a Sample for Coverage Measurement and Measurement Thereof)

The surface layer 4 of the developing roller 1 was cut by a razor blade perpendicular to the conductive mandrel 2 and the cut piece was embedded in a hardenable acrylic resin with visible light. Next, the resin was trimmed/sliced by an ultramicrotome (trade name: "EM-ULTRACUT•S", manufactured by Leica Microsystems Co., Ltd.) equipped with a diamond knife in a cryo-system (trade name: "REICHERT-NISSEI-FCS", manufactured by Leica Microsystems Co., Ltd.) to prepare extremely-thin cut-pieces. Thereafter, an observation was made under a transmission electron microscope (trade name: "JEM-2100", manufactured by JEOL Ltd.) at an acceleration voltage of 200 kV. Magnification was controlled so as to obtain an image in which an edge line formed in the interface between the urethane resin and the urethane resin particle was 2.0 μm or more, and a photograph was taken. Based on the image, coverage was obtained. The calculation for obtaining coverage based on an image will be described later. Furthermore, the substance (element) present in the interface between the urethane resin and the urethane resin particle was analyzed by EDAX. In this manner, whether the element is silicon, titanium or aluminum was determined.

(Calculation of Coverage Based on Image)

Based on the transmission electron microscopic (TEM) image obtained as mentioned above, the length (A) of the edge line formed in the interface between a urethane resin and a urethane resin particle was measured. Subsequently, the length of an edge line, at which the urethane resin was not in direct contact with the urethane resin particle because of the presence of fine inorganic particle, was measured and the sum (B) of the lengths of edge-lines was obtained. The coverage was obtained by the formula (I) below.

$$\text{Coverage } (\%)=B/A\times 100 \qquad \text{Formula (I)}$$

According to the measurement method, 100 points were arbitrary selected in the surface layer 4 in an image region of the developing roller 1 and the coverage thereof was calculated. An arithmetic average value thereof was specified as the coverage in the present invention.

Furthermore, if the urethane resin particle contained in the surface layer 4 differs in urethane type from the urethane resin serving as a binder, in which the urethane resin particle are dispersed, slight scattering of toner can be particularly effectively suppressed. To describe more specifically, when ether urethane was used as the urethane resin of the surface layer 4 serving as a binder, ester urethane or carbonate urethane was better used in the urethane resin particle than ether urethane, because reduction of scattering of toner was larger. The reason thereof is not completely elucidated but estimated as follows: When the urethane resin serving as a binder and the urethane resin constituting a resin particle differ in urethane type, they differs in character frequency. As a result, resonance is reduced when a deformed convex portion on the surface of the developing roller returns to an original shape after passing through the nip between a developing roller and an electrophotographic photosensitive member. Consequently, scattering of toner is considered to be suppressed more effectively.

The types of urethane of the above urethane resin and a urethane resin particle can be specified by thermolytic GC/MS, NMR, IR and element analysis, etc.

As the conductive material that is used to impart conductivity to the surface layer 4, carbon black and an ionic conductive material that can be used in the elastic layer 3 can be also used. The content of the conductive material in the surface layer 4 that can be used falls within the range of 0.5 to 50 parts by mass relative to the urethane resin (100 parts by mass) of the surface layer 4, and more preferably, within the range of 1 to 30 parts by mass. Furthermore, the electrical resistance of the developing roller 1 having the surface layer 4 formed on the elastic layer 3 is preferably $1\times10^{3}\Omega$ or more and $1\times10^{13}\Omega$ or less, and particularly preferably $1\times10^{4}\Omega$ or more and $1\times10^{12}\Omega$ or less.

The surface roughness of the developing roller 1 represented by Rzjis according to the Japanese industry standards (JIS) B0601: 2001 is preferably 2 μm or more and 25 μm or less, and particularly preferably 5 μm or more and 15 μm or less. Note that Rzjis was measured by use of a contact-type surface roughness meter (trade name: surfcorder SE3500, manufactured by Kosaka Laboratory Ltd.). As the measurement conditions, a cut-off value was set at 0.8 mm, a measurement length was set at 2.5 mm, and a feed speed was set at 0.1 mm/second and magnification at 5000×. Surface roughness Rz was measured at 9 arbitrary points per developing roller. The arithmetic average value of the measurement values thus obtained was specified as the Rz of the developing roller 1.

A method for manufacturing the surface layer 4 will be described. Raw materials for a urethane resin, that is, a polyol compound and an isocyanate compound; a urethane resin particle and a conductive material are previously stirred and kneaded by a ball mill, or the like to obtain a composition for forming a surface layer. The obtained surface layer formation composition is applied to the surface of the aforementioned elastic layer 3 by coating, such as by a spray, and/or by dipping and roll-coating to form a coating film, which is then thermally cured. At this time, in order to complete the reaction between the polyol compound and the isocyanate compound, thermal curing is preferably performed at 130° C. or more and 160° C. or less for one hour or more and 4 hours or less.

(Process Cartridge, Electrophotographic Image Forming Apparatus)

A process cartridge according to the present invention has a developing roller 1 according to the present invention and an electrophotographic photosensitive member 21 in contact with the developing roller 1, and is detachably attached to the main body of the electrophotographic image forming apparatus. Furthermore, an electrophotographic image forming apparatus according to the present invention has an electrophotographic photosensitive member and a developing roller arranged in contact with the electrophotographic photosensitive member, characterized in that the developing roller is the developing roller 1 having the aforementioned structure. As the electrophotographic image forming apparatus, one having the following units can be exemplified.

an electrophotographic photosensitive member bearing an electrostatic latent image, a charge unit for primary charging the electrophotographic photosensitive member, a light exposure unit for forming an electrostatic latent on the electrophotographic photosensitive member primary charged, and a developing unit having a developing roller for forming a developer image by developing the electrostatic latent image with a developer, and a transfer unit for transferring the developer image onto a transfer material.

Figure 4:
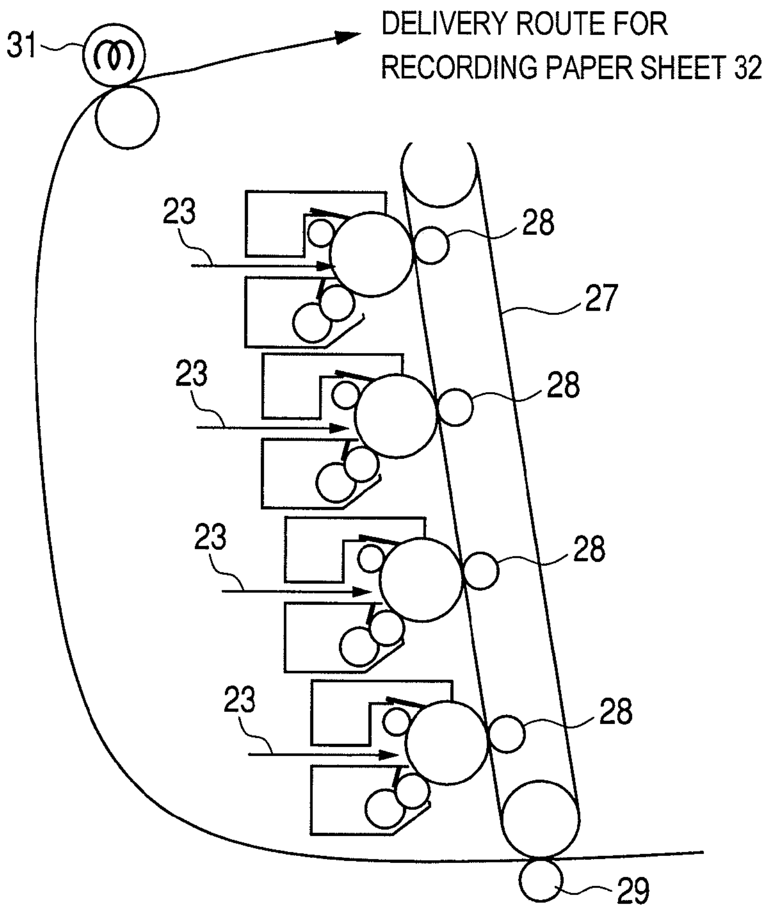
FIG. 4 is a schematic structural view illustrating an electrophotographic image forming apparatus of the present invention.
Figure 5:
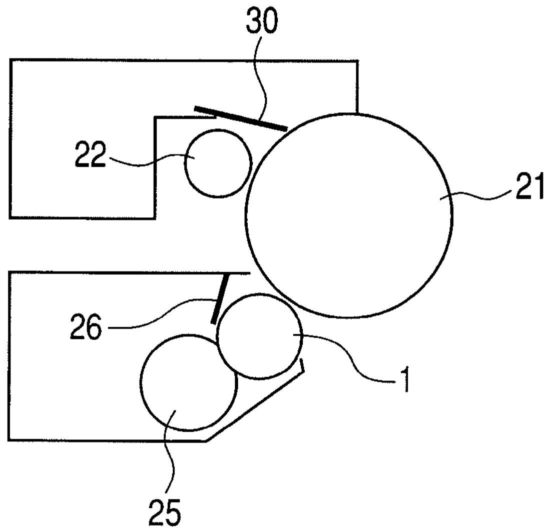
FIG. 5 is a schematic structural view illustrating a process cartridge of the present invention.

FIG. 4 is a schematic sectional view illustrating the electrophotographic image forming apparatus equipped with 4 process cartridges illustrated in FIG. 5. An electrophotographic photosensitive member 21 is uniformly charged by a charge member 22 connected to a bias power source (not shown). The charge potential at this time is about −400 V to −800 V. Next, an electrostatic latent image is formed on the surface of the electrophotographic photosensitive member 21 by light 23 for forming the electrostatic latent image. As the light 23 for forming an electrostatic latent image, an LED light and a laser light etc. are used. The surface potential of the electrophotographic photosensitive member 21 exposed to light is from about −100 V to −200 V. Next, a negatively charged developer is applied to the electrostatic latent image by the developing roller 1 housed in a process cartridge, which is detachably attached to the main body of the electrophotographic image forming apparatus. In this manner, the electrostatic latent image is converted (developed) into a visible image. At this time, a voltage of about −300 V to −500 V is applied to the developing roller 1 by a bias power source (not shown).

Next, the developer image developed on the electrophotographic photosensitive member 21 is primarily transferred to an intermediate transfer belt 27. A primary transfer member 28 is in contact with the rear surface of the intermediate transfer belt 27. When a voltage of about +100 V to +1500 V is applied to the primary transfer member 28, the negatively charged developer image is primarily transferred from the electrophotographic photosensitive member 21 to the intermediate transfer belt 27. The primary transfer member 28 may be a roller or a blade. When the electrophotographic image forming apparatus is a full-color image forming apparatus as illustrated in FIG. 4, the aforementioned charging, light exposure, developing and primary transfer steps are repeated, for example, with respect to each color of yellow, cyan, magenta and black. For the operation, in the electrophotographic image forming apparatus illustrated in FIG. 4, four process cartridges housing different-color developers are detachably attached to the main body of the electrophotographic image forming apparatus. Note that the developing roller 1 is in contact with the electrophotographic photosensitive member 21 at a nip width of 0.5 mm or more and 3 mm or less and rotated at a different circumferential speed relative to the electrophotographic photosensitive member 21. As the different circumferential speed, the developing roller 1 rotates at a circumferential speed, which is larger than 1.0 and smaller than 2.0, relative to that of the electrophotographic photosensitive member 21. In the developing unit, a developer supply roller 25 is rotatably arranged and in contact with the developing roller 1 upstream in the rotation direction, as viewed from the portion at which a developing blade 26 serving as a developer regulation member in contact with the developing roller 1. The above charging, light exposure, developing and primary transfer steps are sequentially performed at predetermined time intervals. In this manner, 4 color developer images for expressing a full color image are superposed on the intermediate transfer belt 27. The developer image on the intermediate transfer belt 27 is transferred to a position facing a secondary transfer member 29 by rotation of the intermediate transfer belt. At this time, a recording paper sheet 32 is already transferred to the space between the intermediate transfer belt 27 and the secondary transfer member 29, at a predetermined timing. When a secondary bias voltage is applied to the secondary transfer member, the developer image on the intermediate transfer belt 27 is transferred to the recording paper sheet 32. The bias voltage to be applied to the secondary transfer member 29 at this time is from about +1000 V to +4000 V. The recording paper sheet 32, on which the developer image is transferred by the secondary transfer member 29, is transferred to a fixing member 31. The developer image on the recording paper sheet 32 is melted and fixed on the recording paper sheet 32, which is thereafter discharged out of the image forming apparatus. In this way, a printing operation is terminated.

Note that in the electrophotographic image forming apparatus illustrated in FIG. 4 and exemplified as an example of the electrophotographic image forming apparatus of the present invention, a developer image is transferred first to the intermediate transfer belt 27 and then transferred to the recording paper sheet 32; however, a system in which an developer image is transferred directly to the recording paper sheet 32 without passing through the intermediate transfer belt 27 may be employed. Furthermore, a developing roller according to according to the present invention may not be integrated into a process cartridge but directly integrated into the electrophotographic image forming apparatus.

EXAMPLES

Specific Examples and Comparative Examples according to the present invention will be described below. In the present invention, the hydroxyl value of a polyol compound was measured according to JIS K-1557. Furthermore, NCO % of isocyanate on a solid basis in the present invention was measured as follows. A sample was dissolved in toluene, and a monochloro benzene solution containing 0.5 mol/l of dibutyl amine was added thereto. A reaction was conducted while heating under reflux conditions for 30 minutes and cooled to room temperature. Thereafter, methanol was added as an auxiliary solvent and excessive amine was reversely titered with hydrochloric acid (0.5 mol/l). The value thus obtained was converted to a value on a solid base. An average of measured values (n=3) was used.

Furthermore, the average particle size (volume average particle size) of urethane resin particles at the time of synthesis and a maximum particle size in a particle size distribution were determined by the following apparatus. As the measuring apparatus, use was made of an accurate particle-size distribution measuring apparatus (trade name: Coulter counter manufactured by Multisizer Beckman Coulter, Inc.) equipped with a 100 μm aperture tube and based on a pore electric resistance method. Measurement conditions were set and measurement data was analyzed according to special software (trade name "Beckman Coulter Multisizer 3 Version 3.51, manufactured by Beckman Coulter, Inc.) attached to the accurate particle-size distribution measuring apparatus. Note that measurement was performed using effective measurement channels of 25,000. As an aqueous electrolytic solution to be used for measurement, "ISOTON II" (trade name: manufactured by Beckman Coulter, Inc.) was used.

A: Synthesis Examples of a Base Material of a Urethane Resin Particle

Synthesis Example A-1

Synthesis of a Base Material 1 of a Urethane Resin Particle

An autoclave (volume: 2 liter) was prepared and sufficiently purged with nitrogen gas and dried. To the autoclave, the following materials were loaded.

Trifunctional polypropylene polyol (trade name: MN-400, hydroxyl value: 235 mg KOH/g, manufactured by Mitsui Takeda Chemical Polyurethane): 700 parts by mass, and Hexamethylene diisocyanate (manufactured by Nippon Polyurethane Industry Co., Ltd.): 1000 parts by mass.

Next, the autoclave was purged with nitrogen gas and then sealed airtight. The reaction was conducted at a temperature of 120° C. for 20 hours while stirring. Subsequently, unreacted hexamethylene diisocyanate was removed and toluene was added to obtain a synthetic substance (1) having a nonvolatile content of 90% by mass. The NCO % of the synthetic substance (1) was 9.1%.

Next, the following materials were mixed in a separable flask (volume: 2 liter) with a stirrer to prepare a dispersion medium.

Water: 900 parts by mass,

Cellulose derivative (trade name: Metrose 90SH-100, manufactured by Shin-Etsu Chemical Co., Ltd.): 32 parts by mass.

While the dispersion medium was stirred at 600 rpm, a solution of the synthetic substance (1), which was prepared by diluting the synthetic substance (1) (261 parts by mass) with toluene (112 parts by mass), was added to the dispersion medium to prepare a suspension solution. The suspension solution was continuously stirred and the temperature of the suspension solution was increased to 60° C., and a reaction was performed for 1.5 hours. Thereafter, the reaction solution was cooled to room temperature. A solid content was separated from a liquid content and sufficiently washed with water, dried at 70° C. for 20 hours to obtain base material 1 of urethane resin particles formed of ether urethane and having an average particle size of 5.0 μm and a maximum particle size of 20.3 μm.

(A-2: Synthesis of Base Material 2 of Urethane Resin Particle)

The amount of cellulose derivative of Synthesis Example A-1 was changed to 30 parts by mass. Base material 2 of urethane resin particles formed of ether urethane and having an average particle size of 10.3 μm and a maximum particle size of 27.2 μm was obtained in the same manner as in Synthesis Example A-1 except the aforementioned condition.

(A-3: Synthesis Example of Base Material 3 of Urethane Resin Particle)

The amount of cellulose derivative of Synthesis Example A-1 was changed to 26 parts by mass. Base material 3 of urethane resin particles formed of ether urethane and having an average particle size of 18.1 μm and a maximum particle size of 52.3 μm was obtained in the same manner as in Synthesis Example A-1 except the aforementioned condition.

(A-4: Synthesis Example of Base Material 4 of Urethane Resin Particle)

In the preparation step of the synthetic substance (1) of Synthesis Example A-1, 700 parts by mass of a trifunctional polypropylene polyol was changed to 800 parts by mass of trifunctional polycaprolactone polyol (trade name: PLACCEL 312 having a hydroxyl value of 134 mg KOH/g and manufactured by Daicel Chemical Industries, Ltd.). Furthermore, the amount of hexamethylene diisocyanate was changed to 650 parts by mass. A synthetic substance (2) was prepared in the same manner as in Synthesis Example A-1 for obtaining the synthetic substance (1) except the aforementioned conditions. The NCO % of the synthetic substance (2) was 5.6%. Subsequently, base material 4 of urethane resin particles formed of ester urethane and having an average particle size of 5.3 μm and a maximum particle size of 22.1 μm was obtained in the same manner as in Synthesis Example A-1 except that synthetic substance (1) of Synthesis Example A-1 was changed to the aforementioned synthetic substance (2).

(A-5: Synthesis Example of Base Material 5 of Urethane Resin Particle)

The amount of cellulose derivative of Synthesis Example A-4 was changed to 30 parts by mass. Base material 5 of urethane resin particles formed of ester urethane and having an average particle size of 10.2 μm and a maximum particle size of 29.1 μm was obtained in the same manner as in Synthesis Example A-4 except the aforementioned condition.

(A-6: Synthesis Example of Base Material 6 of Urethane Resin Particle)

The amount of cellulose derivative of Synthesis Example A-4 was changed to 26 parts by mass. Base material 6 of urethane resin particles formed of ester urethane and having an average particle size of 18.3 μm and a maximum particle size of 53.1 μm was obtained in the same manner as in Synthesis Example A-4 except the aforementioned condition.

(A-7: Synthesis Example of Base Material 7 of Urethane Resin Particle)

In the preparation step of the synthetic substance (1) of Synthesis Example A-1, 700 parts by mass of a trifunctional polypropylene polyol was changed to 900 parts by mass of a bifunctional polycarbonate polyol "PLACCEL 210CD" (trade name, having a hydroxyl value of 114 mg KOH/g and manufactured by Daicel Chemical Industries, Ltd.). Furthermore, the amount of hexamethylene diisocyanate was changed to 600 parts by mass. A synthetic substance (3) having a nonvolatile content 90% by mass was obtained in the same manner as in Synthesis Example A-1 for obtaining the synthetic substance (1) except the aforementioned conditions. The NCO % of the synthetic substance (3) was 2.1%. Subsequently, base material 7 of urethane resin particles formed of carbonate urethane and having an average particle size of 5.1 μm and a maximum particle size of 21.0 μm was obtained in the same manner as in Synthesis Example A-1 except that synthetic substance (1) of Synthesis Example A-1 was changed to the aforementioned synthetic substance (3).

(A-8: Synthesis Example of Base Material 8 of Urethane Resin Particle)

Base material 8 of urethane resin particles formed of carbonate urethane and having an average particle size of 9.9 μm and a maximum particle size of 26.6 μm was obtained in the same manner as in Synthesis Example A-7 except that the amount of cellulose derivative of Synthesis Example A-7 was changed to 30 parts by mass.

(A-9: Synthesis Example of Base Material 9 of Urethane Resin Particle)

Base material 9 of urethane resin particles formed of carbonate urethane and having an average particle size of 18.2 μm and a maximum particle size of 50.2 μm was obtained in the same manner as in Synthesis Example A-7 except that the amount of cellulose derivative of Synthesis Example A-7 was changed to 26 parts by mass.

B: Preparation of Urethane Resin Particle

Preparation of Urethane Resin Particles 1 to 36

Urethane resin particles 1 to 36 were obtained by externally adding fine inorganic particles in amounts shown in Table 1 to base materials 1 to 9 of urethane resin particles (100 parts by mass) obtained in Synthesis Examples A-1 to A-9. External addition was performed by a treatment using a Henschel mixer (manufactured by Mitsui Miike) at rotation number of 3000/minute for 15 minutes. Furthermore, the inorganic particles Nos. 1 to 4 shown in Table A are as follows.

TABLE A

| Inorganic particle No. | Raw material, Trade name, etc. |
|---|---|
| 1 | Titanium oxide: average particle size of 0.18 μm (trade name: "JA-1", manufactured by Tayca Corp.) |
| 2 | Silica: average primary particle size of 15 nm, BET specific surface area of 120 $m^2/g$ (trade name: "REOLOSIL MT-10", manufactured by Tokuyama Corp.) |
| 3 | Silica 2: average primary particle size of 40 nm, BET specific surface area of 50 $m^2/g$ (trade name: "OX50", manufactured by Nippon Aerosil Co., Ltd.) |
| 4 | Alumina: average primary particle size of 13 nm, BET specific surface area of 100 $m^2/g$ (trade name: "AluC805", manufactured by Nippon Aerosil Co., Ltd.) |

Urethane resin particles 1 to 36 manufactured were checked for coverage with fine inorganic particles according to the following method. These values are also shown in Table 1.

(Method of Measuring Coverage of Urethane Resin Particles 1 to 36)

<Sample Preparation>

Each of the urethane resin particles was embedded in a hardenable acrylic resin with visible light. Next, the resin is trimmed/sliced by an ultramicrotome (trade name: "EM-ULTRACUT•S", manufactured by Raika Co., Ltd.) equipped with a diamond knife in a cryo system (trade name: "REICHERT-NISSEI-FCS", manufactured by Raika Co., Ltd.) to prepare extremely thin cut-pieces. Thereafter, observations were made under a transmission electron microscope (trade name: "JEM-2100", manufactured by JEOL Ltd.) at an acceleration voltage of 200 kV. Magnification was controlled so as to obtain an image in which an edge line formed in the circumference of the section of the urethane resin particle was 2.0 μm or more, and a photograph is taken. Based on the image, coverage was obtained. The calculation method for obtaining coverage based on an image is as follows.

<Calculation of Coverage Based on Image>

Based on the transmission electron microscopic (TEM) image obtained as mentioned above, the length (A) of the edge line in the circumference of the section of a urethane resin particles was measured. Subsequently, the length of an edge line at which fine inorganic particles are in direct contact with a urethane resin particles was measured and the sum (B) of the lengths of edge-lines was obtained. The coverage was obtained by the following formula 1.

$$\text{Coverage (\%)}=B/A\times100 \quad \text{formula 1}$$

According to the measurement method, 100 parts in urethane resin particles were arbitrary selected and the coverage thereof were calculated. An arithmetic average value thereof was specified as the coverage of the urethane resin particle.

(Urethane Resin Particles 37 to 39)

As urethane resin particles 37 to 39, base materials of the urethane resin particles shown in Table 1 below were used as they were without adding fine inorganic particles thereto.

TABLE 1

| Urethane resin particle No. | Base material No. of Urethane resin particle | Fine inorganic particle No. | Amount of fine inorganic particles externally added (parts by mass) | Coverage (%) |
|---|---|---|---|---|
| 1 | 1 | 1 | 3.12 | 26.2 |
| 2 | 1 | 1 | 3.75 | 31.0 |
| 3 | 1 | 2 | 0.33 | 68.2 |
| 4 | 1 | 3 | 0.42 | 30.5 |
| 5 | 4 | 2 | 0.38 | 79.9 |
| 6 | 4 | 3 | 0.72 | 52.9 |
| 7 | 4 | 4 | 0.36 | 80.2 |
| 8 | 4 | 4 | 0.38 | 85.1 |
| 9 | 7 | 2 | 0.33 | 67.0 |
| 10 | 7 | 3 | 0.72 | 53.4 |
| 11 | 2 | 1 | 1.58 | 25.8 |
| 12 | 2 | 1 | 1.89 | 31.0 |
| 13 | 2 | 2 | 0.17 | 67.3 |
| 14 | 2 | 3 | 0.21 | 30.5 |
| 15 | 5 | 2 | 0.20 | 80.0 |
| 16 | 5 | 3 | 0.36 | 52.7 |
| 17 | 5 | 4 | 0.18 | 79.3 |
| 18 | 5 | 4 | 0.20 | 86.8 |
| 19 | 8 | 2 | 0.17 | 66.0 |
| 20 | 8 | 3 | 0.36 | 53.6 |
| 21 | 3 | 1 | 2.80 | 26.4 |
| 22 | 3 | 1 | 2.98 | 31.1 |
| 23 | 3 | 2 | 0.10 | 68.0 |
| 24 | 3 | 3 | 0.12 | 30.3 |
| 25 | 6 | 2 | 0.12 | 79.8 |
| 26 | 6 | 3 | 0.20 | 52.4 |
| 27 | 6 | 4 | 0.10 | 78.9 |
| 28 | 6 | 4 | 0.11 | 86.3 |
| 29 | 9 | 2 | 0.10 | 66.2 |
| 30 | 9 | 3 | 0.20 | 52.8 |
| 31 | 1 | 2 | 0.80 | 100.0 |
| 32 | 4 | 4 | 0.80 | 100.0 |
| 33 | 8 | 2 | 0.65 | 100.0 |
| 34 | 5 | 4 | 0.65 | 100.0 |
| 35 | 3 | 2 | 0.55 | 100.0 |

TABLE 1-continued

| Urethane resin particle No. | Base material No. of Urethane resin particle | Fine inorganic particle No. | Amount of fine inorganic particles externally added (parts by mass) | Coverage (%) |
|---|---|---|---|---|
| 36 | 6 | 4 | 0.55 | 100.0 |
| 37 | 1 | — | — | 0.0 |
| 38 | 5 | — | — | 0.0 |
| 39 | 9 | — | — | 0.0 |

C: Preparation of Raw Materials for Forming Surface Layer

Raw materials of a urethane resin for forming a surface layer were prepared.

(C-1: Synthesis Example of Polyol Compound A)

The following compounds were mixed in a stepwise fashion.

Methylethyl ketone (MEK): 79.6 parts by mass,

Polytetramethylene glycol (trade name: "PTG1000SN", manufactured by Hodogaya Chemical Co., Ltd.): 100.0 parts by mass, 4,4-Diphenylmethane diisocyanate (trade name: manufactured by "Cosmonate PH", Manufactured by Mitsui Chemical Polyurethane): 19.4 parts by mass.

The mixture thus obtained was allowed to react under a nitrogen atmosphere at a temperature of 80° C. for 4.5 hours to obtain an MEK solution of polyether polyurethane polyol A having a weight average molecular weight (Mw) of 10000, a hydroxyl value of 22 (mg KOH/g) and the number of functional groups: 2.0.

(C-2: Synthesis Example of Polyol Compound B)

An MEK solution of polyester polyurethane polyol B having a weight average molecular weight (Mw) of 10000, a hydroxyl value of 21 (mg KOH/g) and the number of functional groups: 2.0 was obtained in the same manner as in Synthesis Example C-1 except a mixture of the following materials was used.

Methylethyl ketone (MEK): 79.6 parts by mass,

Polyester polyol (trade name: "P-1010", manufactured by Kuraray Co., Ltd.): 100.0 parts by mass, 4,4-Diphenylmethane diisocyanate (trade name: "Cosmonate PH", manufactured by Mitsui Chemical Polyurethane): 19.4 parts by mass.

(C-3: Synthesis Example of Polyol Compound C)

An MEK solution of polycarbonate polyurethane polyol C having a weight average molecular weight (Mw) of 10000, a hydroxyl value of 21 (mg KOH/g) and the number of functional groups: 2.0 was obtained in the same manner as in Synthesis Example C-1 except a mixture of the following materials was used.

Methylethyl ketone (MEK): 79.6 parts by mass,

Polycarbonate polyol (trade name: "PLACCEL CD 210", manufactured by Daicel Chemical Industries, Ltd.): 100.0 parts by mass, 4,4-Diphenylmethane diisocyanate (trade name: "Cosmonate PH", manufactured by Mitsui Chemical Polyurethane): 19.4 parts by mass.

(C-4: Synthesis Example of Isocyanate Compound D)

The following materials were reacted while heating under a nitrogen atmosphere at 80° C. for 2 hours.

Polytetramethylene glycol (trade name: "PTG 1000SN", manufactured by Hodogaya Chemical Co., Ltd): 100.0 parts by mass, Polymeric diphenylmethane diisocyanate (trade name: "Milionate MR-200", manufactured by Nippon Polyurethane Industry Co., Ltd.): 69.6 parts by mass.

To the reactant, butyl cellosolve (72.7 parts by mass) was added. Subsequently, the temperature of the reactant was set to 50° C. To the reactant, 25.8 parts by mass of 2-butanone oxime (manufactured by Ardrich) was added dropwise to obtain a butyl cellosolve solution of isocyanate compound D having an average number of functional groups: 3.5.

(C-5: Synthesis Example of Isocyanate Compound E)

The following materials were reacted while heating under a nitrogen atmosphere at 80° C. for 2 hours.

Polyester polyol (trade name: "P-1010", manufactured by Kuraray Co., Ltd.): 100.0 parts by mass, Polymeric diphenylmethane diisocyanate (trade name: "Milionate MR-200", manufactured by Nippon Polyurethane Industry Co., Ltd.): 69.6 parts by mass.

To the reactant, butyl cellosolve (72.7 parts by mass) was added. Subsequently, the temperature of the reactant was set to 50° C. To the reactant, 5.8 parts by mass of 2-butanone oxime (manufactured by Ardrich) was added dropwise to obtain a butyl cellosolve solution of isocyanate compound E having an average number of functional groups: 3.5.

(C-6: Synthesis Example of Isocyanate Compound F)

The following materials were reacted while heating under a nitrogen atmosphere at 80° C. for 2 hours.

Polycarbonate polyol (trade name: "PLACCEL CD210", manufactured by Daicel Chemical Industries, Ltd.): 100.0 parts by mass, Polymeric diphenylmethane diisocyanate (trade name: "Milionate MR-200", manufactured by Nippon Polyurethane Industry Co., Ltd.): 69.6 parts by mass.

To the reactant, butyl cellosolve (72.7 parts by mass) was added. Subsequently, the temperature of the reactant was set to 50° C. To the reactant, 5.8 parts by mass of 2-butanone oxime (manufactured by Ardrich) was added dropwise to obtain a butyl cellosolve solution of isocyanate compound F having an average number of functional groups: 3.5.

D: Manufacture of Elastic Roller

The conductive mandrel 2 was prepared by coating a core metal formed of SUS 304 and having a diameter of 6 mm with a primer (trade name: "DY35-051", manufactured by Dow Corning Toray, Co., Ltd.) and baking it at a temperature of 150° C. for 30 minutes. Subsequently, the conductive mandrel 2 was placed in a mold, and liquid-state conductive silicone rubber (a product having ASKER-C hardness of 45°, volume resistivity of $1\times10^5$ Ω·cm, manufactured by Dow Corning Toray, Co., Ltd.) was poured in a cavity formed within the mold. Subsequently, the mold was heated to perform vulcanization of the silicone rubber at 150° C. for 15 minutes. A product was removed from the mold and heated at 200° C. for 2 hours to complete a hardening reaction. In this manner, an elastic roller formed of an elastic layer 3 of 12 mm in diameter around the conductive mandrel 2 was manufactured.

Example 1

Preparation of Coating Material for Forming Surface Layer

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles No. 1: 30 parts by mass,

Carbon black (trade name: "MA100", manufactured by Mitsubishi Chemical Corporation): 20 parts by mass.

<Manufacture of Developing Roller>

The elastic roller previously manufactured was dip coated in the coating solution for forming a surface layer prepared above and coated with the solution. After the coating solution was dried, it was hardened by heating at a temperature of 140° C. for 2 hours. Thereafter, the surface layer 4 of 6.0 μm in film thickness was provided on the circumference of the elastic layer 3 to obtain the developing roller of Example 1.

Examples 2 to 10

Developing rollers were prepared in the same manner as in Example 1 except that the composition of the coating material for forming a surface layer of Example 1 was changed to those shown in Table 2 below.

TABLE 2

| | Polyol compound | Isocyanate compound | Urethane resin particle |
|---|---|---|---|
| Example 2 | A | D | 2 |
| Example 3 | A | D | 3 |
| Example 4 | B | E | 4 |
| Example 5 | A | D | 5 |
| Example 6 | B | E | 6 |
| Example 7 | B | E | 7 |
| Example 8 | B | E | 8 |
| Example 9 | A | D | 9 |
| Example 10 | C | F | 10 |

Example 11

A developing roller was manufactured in the same manner as in Example 1 except that the surface layer 4 of Example 1 was prepared as follows:

<Preparation of Coating Material for Forming Surface Layer>

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles 11: 22 parts by mass,

Carbon black (trade name: "MA100", manufactured by Mitsubishi Chemical Corporation): 20 parts by mass.

<Manufacture of Developing Roller>

The elastic roller previously manufactured was dip coated in the coating solution prepared above and coated with the solution. After the coating solution was dried, it was hardened by heating at a temperature of 140° C. for 2 hours. Thereafter, the surface layer 4 of 12.0 μm in film thickness was provided on the circumference of the elastic layer 3 to obtain the developing roller of Example 11.

Examples 12 to 20

Developing rollers were prepared in the same manner as in Example 11 except that the composition of the coating material for forming a surface layer of Example 11 was changed to those shown in Table 3 below.

TABLE 3

| | Polyol compound | Isocyanate compound | Urethane resin particle |
|---|---|---|---|
| Example 12 | A | D | 12 |
| Example 13 | A | D | 13 |
| Example 14 | B | E | 14 |
| Example 15 | A | D | 15 |
| Example 16 | B | E | 16 |
| Example 17 | B | E | 17 |
| Example 18 | B | E | 18 |
| Example 19 | A | D | 19 |
| Example 20 | C | F | 20 |

Example 21

A developing roller was manufactured in the same manner as in Example 1 except that the surface layer 4 of Example 1 was prepared as follows:

<Preparation of Coating Material for Forming Surface Layer>

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles 21: 15 parts by mass,

Carbon black (trade name: "MA100", manufactured by Mitsubishi Chemical Corporation): 20 parts by mass.

<Manufacture of Developing Roller>

Next, the elastic roller 3 was dip coated in the coating solution prepared above and coated with the solution. After the coating solution was dried, it was hardened by heating at a temperature of 140° C. for 2 hours. Thereafter, the surface layer 4 of 16.0 μm in film thickness was provided on the circumference of the elastic layer 3 to obtain the developing roller of Example 21.

Examples 22 to 30

Developing rollers were prepared in the same manner as in Example 21 except that the composition of the coating material for forming a surface layer of Example 21 was changed to those shown in Table 4 below.

TABLE 4

| | Polyol compound | Isocyanate compound | Urethane resin particle |
|---|---|---|---|
| Example 22 | A | D | 22 |
| Example 23 | A | D | 23 |
| Example 24 | B | E | 24 |
| Example 25 | A | D | 25 |
| Example 26 | B | E | 26 |
| Example 27 | B | E | 27 |
| Example 28 | B | E | 28 |
| Example 29 | A | D | 29 |
| Example 30 | C | F | 30 |

Comparative Examples 1 to 3

Developing rollers according to Comparative Examples 1 to 3 were manufactured in the same manner as in Example 1 except that the composition of the coating material for forming a surface layer of Example 1 was changed to those shown in Table 5 below.

Comparative Examples 4 to 6

Developing rollers according to Comparative Examples 4 to 6 were manufactured in the same manner as in Example 11 except that the composition of the coating material for forming a surface layer of Example 11 was changed to those shown in Table 5 below.

Comparative Examples 7 to 9

Developing rollers according to Comparative Examples 7 to 9 were manufactured in the same manner as in Example 21 except that the composition of the coating material for forming a surface layer of Example 21 was changed to those shown in Table 5 below.

TABLE 5

| | Polyol compound | Isocyanate compound | Urethane resin particle |
|---|---|---|---|
| Comparative Example 1 | A | D | 31 |
| Comparative Example 2 | B | E | 32 |
| Comparative Example 3 | A | D | 37 |
| Comparative Example 4 | A | D | 33 |
| Comparative Example 5 | B | E | 34 |
| Comparative Example 6 | A | D | 38 |
| Comparative Example 7 | A | D | 35 |
| Comparative Example 8 | B | E | 36 |
| Comparative Example 9 | A | D | 39 |

Comparative Example 10

Preparation of Coating Material for Forming Surface Layer

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles 37: 30 parts by mass,

Silica (trade name: “REOLOSIL MT-10”, manufactured by Tokuyama Corp.): 60 parts by mass, Carbon black (trade name: “MA100”, manufactured by Mitsubishi Chemical Corporation): 20 parts by mass.

<Manufacture of Developing Roller>

The elastic roller previously manufactured was dip coated in the coating solution prepared above and coated with the solution. After the coating solution was dried, it was hardened by heating at a temperature of 140° C. for 2 hours. Thereafter, the surface layer 4 of 6.0 μm in film thickness was provided on the circumference of the elastic layer 3 to obtain the developing roller of Comparative Example 10.

Comparative Example 11

Preparation of Coating Material for Forming Surface Layer

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles No. 38: 22 parts by mass,

Titanium oxide (trade name: “JA-1”, manufactured by Tayca Corp.): 100 parts by mass, Carbon black (trade name: “MA100”, manufactured by Mitsubishi Chemical Corporation): 20 parts by mass.

<Manufacture of Developing Roller>

The elastic roller previously manufactured was dip coated in the coating solution prepared above and coated with the solution. After the coating solution was dried, it was hardened by heating at a temperature of 140° C. for 2 hours. Thereafter, the surface layer 4 of 12.0 μm in film thickness was provided on the circumference of the elastic layer 3 to obtain the developing roller of Comparative Example 11.

Comparative Example 12

Preparation of Coating Material for Forming Surface Layer

The following materials were mixed by stirring them by a stirring motor, and dissolved and mixed in MEK so as to obtain a total solid content of 30% by mass. Thereafter, the mixture was uniformly dispersed by a sand mill to obtain a coating material for forming a surface layer.

Polyol compound A: 62 parts by mass (on a solid basis),

Isocyanate compound D: 38 parts by mass (on a solid basis),

Urethane resin particles No. 39: 15 parts by mass,

Alumina (trade name: “AluC805”, manufactured by Nippon Aerosil Co., Ltd.): 85 parts by mass, Carbon black (trade name: “MA100”, manufactured by Mitsubishi Chemical Corporation): 20 parts by mass.

<Manufacture of Developing Roller>

The elastic roller previously manufactured was dip coated in the coating solution prepared above and coated with the solution. After the elastic roller was dried, it was hardened by heating at a temperature of 140° C. for 2 hours. Thereafter, the surface layer 4 of 16.0 μm in film thickness was provided on the circumference of the elastic layer 3 to obtain the developing roller of Comparative Example 12.

Comparative Example 13

Preparation of Coating Material for Forming Surface Layer

The following materials were mixed by stirring them by a stirring motor, and dissolved and mixed in isopropyl alcohol so as to obtain a total solid content of 30% by mass. Thereafter, the mixture was uniformly dispersed by a sand mill to obtain a coating material for forming a surface layer.

Phenol resin (trade name: "J-325", manufactured by DIC Corporation): 100 parts by mass, Urethane resin particles 15: 22 parts by weight, Carbon black (trade name: "MA100", manufactured by Mitsubishi Chemical Corporation): 20 parts by mass.

<Manufacture of Developing Roller>

The elastic roller previously manufactured was dip coated in the coating solution prepared above and coated with the solution. After the coating solution was dried, it was hardened by heating at a temperature of 150° C. for 40 minutes. Thereafter, the surface layer 4 of 12.0 μm in film thickness was provided on the circumference of the elastic layer 3 to obtain the developing roller of Comparative Example 13.

Comparative Example 14

A developing roller was manufactured in the same manner as in Comparative Example 13 except that the urethane resin particles of the surface layer 4 of Comparative Example 13 were changed to acrylic resin particles (a). Note that, the acrylic resin particles (a) were obtained as follows: To 100 parts by mass of an acrylic resin particle (trade name: ART PEARL GR600, manufactured by Negami Chemical Industrial Co., Ltd.), 0.20 parts by mass of silica (trade name: "REOLOSIL MT-10", manufactured by Tokuyama Corp.) was externally added by use of a Henschel mixer (manufactured by Mitsui Miike) at a rotation number of 3000/minute for 15 minutes. The coverage of the acrylic resin particle (a) was 75.1%.

Comparative Example 15

A developing roller was manufactured in the same manner as in Example 11 except that the urethane resin particles of the surface layer 4 of Example 11 was changed to acrylic resin (a) of Comparative Example 14.

<Evaluation>

(1) Coverage of Resin Particles with Inorganic Particles in Surface Layer

The coverage of urethane resin particles (acrylic resin particle in Comparative Examples 14 and 15) dispersed in a surface layer with fine inorganic particles was obtained by the following method.

(1-1) Preparation of a Sample for Obtaining Coverage and Measurement Thereof

The surface layer of a developing roller was cut by a razor blade in perpendicular to the conductive mandrel and embedded in a hardenable acrylic resin with visible light. Next, the resin was trimmed/sliced by an ultramicrotome (trade name: "EM-ULTRACUT•S", manufactured by Raika Co., Ltd.) equipped with a diamond knife in a cryo system (trade name: "REICHERT-NISSEI-FCS", manufactured by Raika Co., Ltd.) to prepare extremely thin cut-pieces. Thereafter, observations were made under a transmission electron microscope (trade name: "JEM-2100", manufactured by JEOL Ltd.) at an acceleration voltage of 200 kV. Magnification was controlled so as to obtain an image in which an edge line formed in the interface between the urethane resin and the urethane resin particle was 2.0 μm or more, and a photograph is taken. Based on the image, coverage was obtained. The calculation method for obtaining coverage based on an image will be described later. Furthermore, the substance present in the interface between the urethane resin and urethane resin particles was determined by element analysis using EDAX. In this manner, whether the element is silicon, titanium or aluminum was determined.

(1-2) Calculation of Coverage Based on Image

Based on the transmission electron microscopic (TEM) image obtained as mentioned above, the length (A) of the edge line formed in the interface between a urethane resin and the urethane resin particles was measured. Subsequently, the length of an edge line, at which the urethane resin is not in direct contact with the urethane resin particles because of the presence of fine inorganic particles, was measured and the sum (B) of the lengths of edge-lines was obtained. The coverage is obtained by the following formula 1.

$$\text{Coverage }(\%)=B/A\times100 \qquad \text{formula 1}$$

According to the measurement method, 100 points are arbitrary selected in the surface layer in an image region of the developing roller and the coverage thereof was calculated. An arithmetic average value thereof was specified as the coverage.

(2) Image Evaluation

The developing rollers according to Examples 1 to 30 and Comparative Examples 1 to 15 were evaluated by the following method.

(2-1) Evaluation of Scattering Image of Toner

A developing roller was evaluated by a color laser printer (trade name: LBP5300, manufactured by Canon Inc.) employing a contact development method. More specifically, the developing roller was installed in a black process cartridge for the color laser printer. Prior to image output, the above process cartridge was installed in the above color laxer printer, and allowed to stand still in the environment of a temperature of 30° C. and a humidity of 80% RH for 24 hours. Thereafter, a horizontal line of 100 μm in width was printed at intervals of 1 mm under the environment of a temperature of 30° C. and a humidity of 80% RH. In this evaluation, power supply was forcibly turned off during the development and the process cartridge was taken out from the color laser printer. Then, scattering of toner developed on the electrophotographic photosensitive member was evaluated.

In the evaluation, the edge of the horizontal-line image on the upstream side of developing was magnified 300× by an optical microscope and the presence or absence and a degree of scattering of toner were observed. Note that, a nonmagnetic one component black developer installed in the above process cartridge was used as it was as the toner. At this time, scattering of toner was evaluated according to the following criteria:

AA: no scattering of toner was observed.

A: extremely slight scattering of toner was observed.

B: a small amount of scattering of toner was observed.

C: a significant amount of scattering of toner was observed.

(2-2) Evaluation of Concentration Irregularity of Half-Tone Image

A developing roller was evaluated by a color laser printer (trade name: "LBP5300", manufactured by Canon Inc.) employing a contact development method. More specifically, the developing roller was installed in a magenta process cartridge for the color laser printer. Prior to image output, the above process cartridge was installed in the above color laser printer, and allowed to stand still in the test environment of a temperature of 30° C./a humidity of 80% RH for 24 hours. In the same environment, an image (2%) was printed out on 15000 sheets. Thereafter, a half-tone image was output and the concentration irregularity in a micro region was microscopically observed by magnifying the image 300×. An evaluation was made according to the following criteria. Note that a nonmagnetic one component magenta developer installed in the above magenta process cartridge was used as it was as the developer. Furthermore, as a recording paper sheet, CLC (color laser copier) paper sheet (size A4, basis weight=81.4 g/$m^2$) manufactured by Canon Inc. was used.

A: no concentration irregularity was observed in half tone image.

B: concentration irregularity was observed in half tone image.

(2-3) Change Rate of Image Density After a Number of Sheets are Printed

A developing roller was evaluated by a color laser printer (trade name: "LBP5300", manufactured by Canon Inc.) employing a contact development method. More specifically, the developing roller was installed in a magenta process cartridge for the color laser printer. Prior to image output, the above process cartridge was installed in the above color laser printer, and allowed to stand still in the test environment of a temperature of 30° C./a humidity of 80% RH for 24 hours. In the same environment, an image (2%) was printed out on 15000 sheets. Thereafter, a solid black image was output and evaluated based on image density. Note that the image density was evaluated based on relative concentration to a white portion of a print out image having an original concentration of 0.00 measured by use of a "Macbeth reflective densitometer" (trade name, manufactured by Macbeth). A change rate was calculated relative to the initial image density.

Note that a nonmagnetic one component magenta developer installed in the above magenta process cartridge was used as it was as the developer. Furthermore, as a recording paper sheet, CLC (color laser copier) paper sheet (size A4, basis weight=81.4 g/$m^2$) manufactured by Canon Inc. was used.

The evaluation results of Examples and Comparative Example are separately shown in Table 6 and Table 7.

TABLE 6

| Evaluation item | Coverage of resin particle in surface layer (%) | (2-1) | (2-2) | (2-3) (%) |
|---|---|---|---|---|
| Example 1 | 26.0 | B | A | 1.31 |
| Example 2 | 30.0 | A | A | 1.93 |
| Example 3 | 68.0 | A | A | 1.52 |
| Example 4 | 30.0 | AA | A | 0.62 |
| Example 5 | 80.0 | AA | A | 0.55 |
| Example 6 | 53.0 | A | A | 1.24 |
| Example 7 | 80.0 | A | A | 1.93 |
| Example 8 | 85.0 | B | A | 2.00 |
| Example 9 | 67.0 | AA | A | 0.90 |
| Example 10 | 53.0 | A | A | 1.79 |
| Example 11 | 25.0 | B | A | 1.52 |
| Example 12 | 30.0 | A | A | 1.66 |
| Example 13 | 67.0 | A | A | 1.17 |
| Example 14 | 30.0 | AA | A | 0.69 |
| Example 15 | 80.0 | AA | A | 0.48 |
| Example 16 | 53.0 | A | A | 1.86 |
| Example 17 | 79.0 | A | A | 1.72 |
| Example 18 | 86.0 | B | A | 1.10 |
| Example 19 | 66.0 | AA | A | 0.76 |
| Example 20 | 53.0 | A | A | 1.45 |
| Example 21 | 25.0 | B | A | 1.59 |
| Example 22 | 30.0 | A | A | 1.86 |
| Example 23 | 68.0 | A | A | 1.24 |
| Example 24 | 30.0 | AA | A | 0.34 |
| Example 25 | 80.0 | AA | A | 0.41 |
| Example 26 | 52.0 | A | A | 1.38 |
| Example 27 | 79.0 | A | A | 1.52 |
| Example 28 | 86.0 | B | A | 1.66 |

TABLE 6-continued

| Evaluation item | Coverage of resin particle in surface layer (%) | (2-1) | (2-2) | (2-3) (%) |
|---|---|---|---|---|
| Example 29 | 66.0 | AA | A | 0.76 |
| Example 30 | 52.0 | A | A | 1.72 |

TABLE 7

| Evaluation item | Coverage of resin particle in surface layer (%) | (2-1) | (2-2) | (2-3) (%) |
|---|---|---|---|---|
| Comparative Example 1 | 100.0 | B | B | 6.62 |
| Comparative Example 2 | 100.0 | B | B | 6.83 |
| Comparative Example 3 | 0.0 | C | A | 0.62 |
| Comparative Example 4 | 100.0 | B | B | 6.76 |
| Comparative Example 5 | 100.0 | B | B | 6.69 |
| Comparative Example 6 | 0.0 | C | A | 0.48 |
| Comparative Example 7 | 100.0 | B | B | 6.62 |
| Comparative Example 8 | 100.0 | B | B | 6.76 |
| Comparative Example 9 | 0.0 | C | A | 0.48 |
| Comparative Example 10 | 0.0 | C | A | 0.34 |
| Comparative Example 11 | 0.0 | C | A | 0.48 |
| Comparative Example 12 | 0.0 | C | A | 0.62 |
| Comparative Example 13 | 78.0 | B | B | 7.38 |
| Comparative Example 14 | 72.0 | B | B | 7.03 |
| Comparative Example 15 | 73.0 | B | B | 7.24 |

As shown in Tables 6 and 7 above, the developing rollers according to Example 1 to 30 show excellent results in all evaluation items (2-1) to (2-3) and found to have well balanced properties. In particular, the developing rollers of Examples 4, 5, 9, 14, 15, 19, 24, and 29 using a urethane resin serving as a binder and urethane resin particles different in urethane type were particularly excellent in evaluation item (2-1).

On the other hand, the developing rollers of Comparative Examples 1, 2, 4, 5, 7 and 8 having a convex portion derived from resin particles completely (a coverage of 100%) covered with inorganic particles showed relatively good results on scattering of toner (evaluation item (2-1)) itself. However, resin particles fell off from the surface layer during long operational use and the transport property of the developer significantly changed with the passage of time. For this reason, as shown in evaluation item (2-3) of Table 7, the concentration change rate of an electrophotographic image was tremendously large compared to those of Examples. Furthermore, in the developing roller of Comparative Examples 3, 6, 9 to 12 having a convex portion derived from resin particles not (a coverage of 0%) covered with inorganic particles, scattering of toner was outstanding.

As is described above, according to the developing roller of the present invention, it is possible to suppress scattering of toner in the proximity of the nip between an electrophotographic photosensitive member and a developing roller and occurrence of concentration irregularity of a half tone image. Furthermore, according to the developing roller of the present invention, the transport property of toner is unlikely to change with the passage of time and thus excellent in durability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-294293, filed Nov. 18, 2008, which is hereby incorporated by reference herein in its entirety.

What is claimed is:

1. A developing roller comprising a mandrel;

an elastic layer provided on the circumference of the mandrel; and a surface layer provided on the circumference of the elastic layer, wherein the surface layer contains a urethane resin serving as a binder and urethane resin particles dispersed in the binder, for forming convex portions on the surface of the surface layer, and wherein surfaces of the urethane resin particles are partly covered with fine inorganic particles containing at least one element selected from silicon, titanium and aluminum, and the urethane resin particles are in direct contact with the binder at surfaces onto which the fine inorganic particles are not attached.

2. The developing roller according to claim 1, wherein the coverage of the urethane resin particles with the fine inorganic particles is 30% or more and 80% or less.

3. The developing roller according to claim 1, wherein the urethane resin serving as a binder and the urethane resin of the urethane resin particles in the surface layer differ in urethane type.

4. The developing roller according to claim 1, wherein the fine inorganic particles are formed of silica.

5. A process cartridge comprising the developing roller according to claim 1 and detachably attached to a main body of an electrophotographic image forming apparatus.

6. An electrophotographic image forming apparatus comprising an electrophotographic photosensitive member and a developing roller arranged in contact with the electrophotographic photosensitive member, wherein the developing roller is the developing roller according to claim 1.

* * * * *